Figure 4:
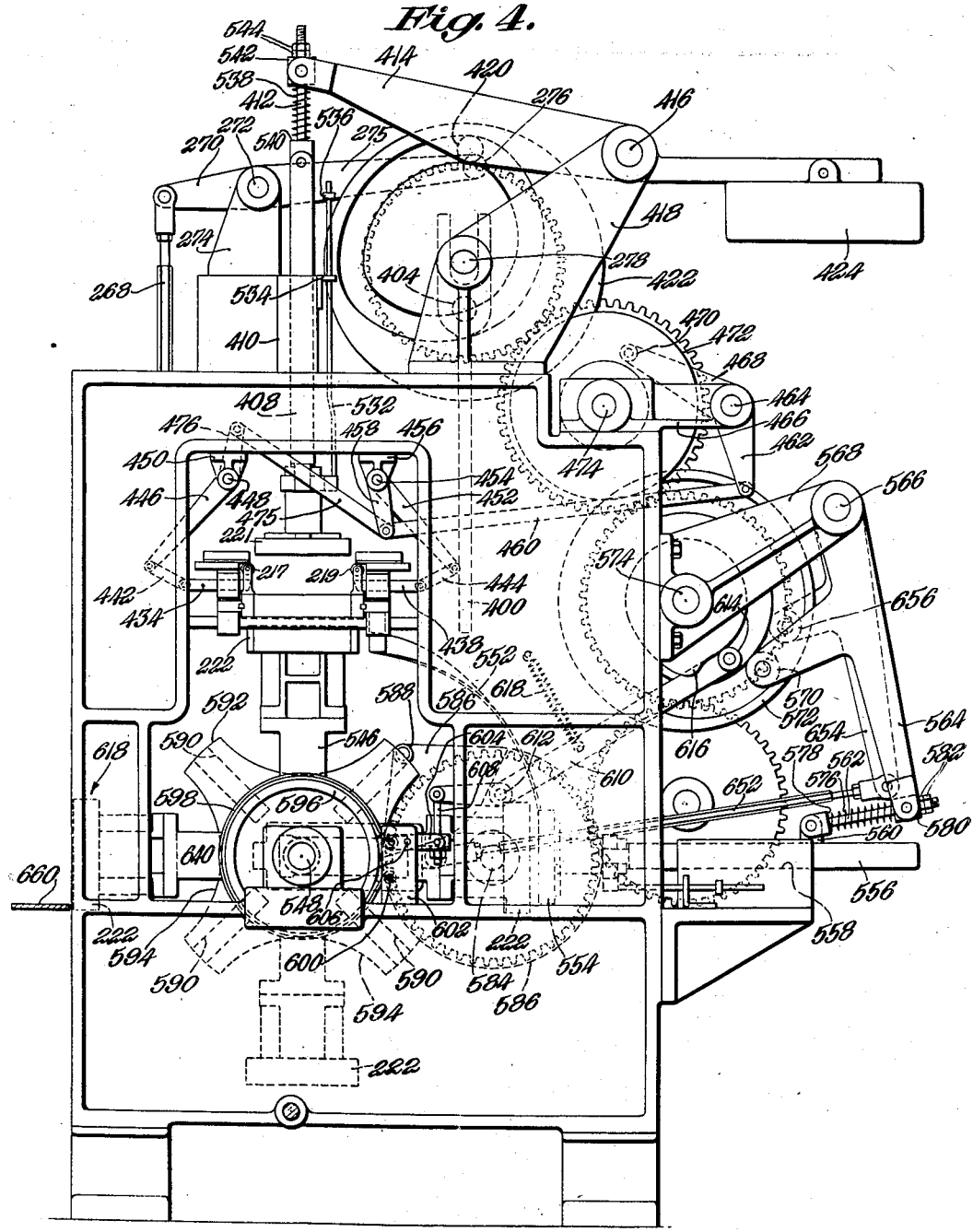

May 6, 1930.   W. A. JOPLIN   1,757,804
BOX MAKING MACHINE
Filed Sept. 3, 1927   12 Sheets-Sheet 1
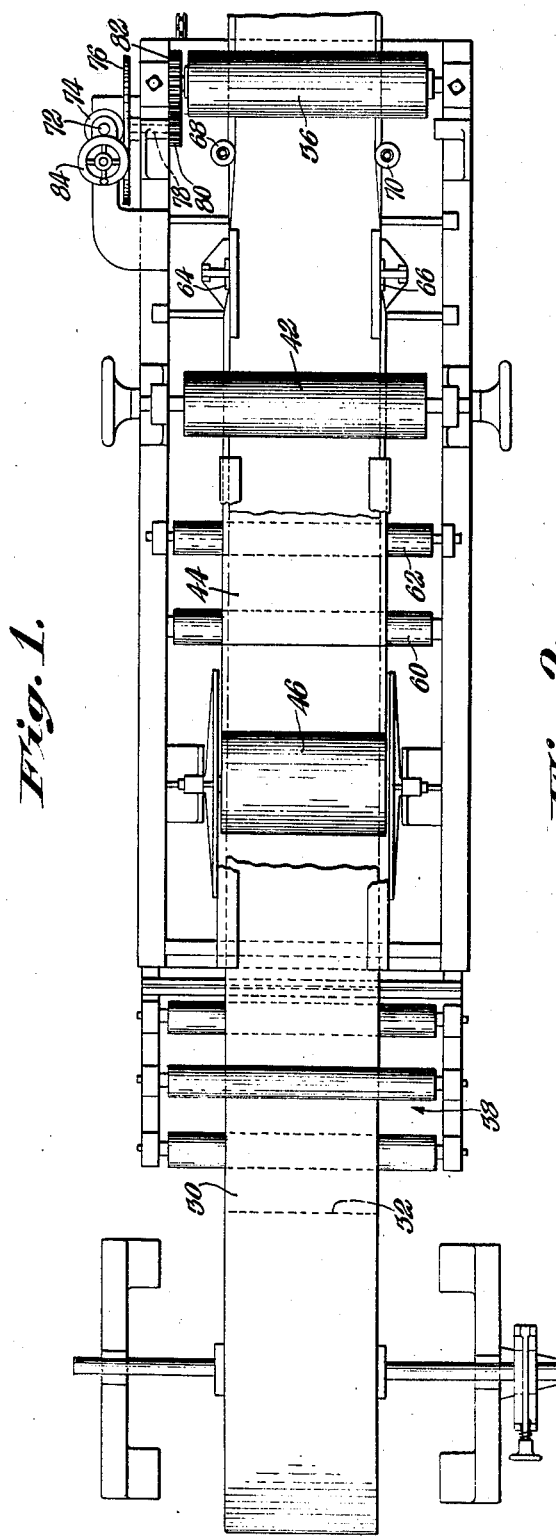
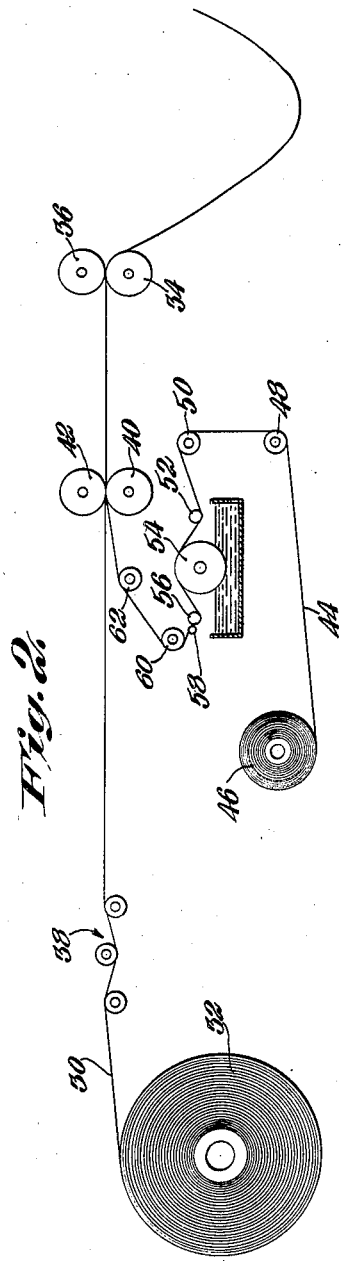
Inventor:
William A. Joplin
by J. Stanley Churchill
Attorney.

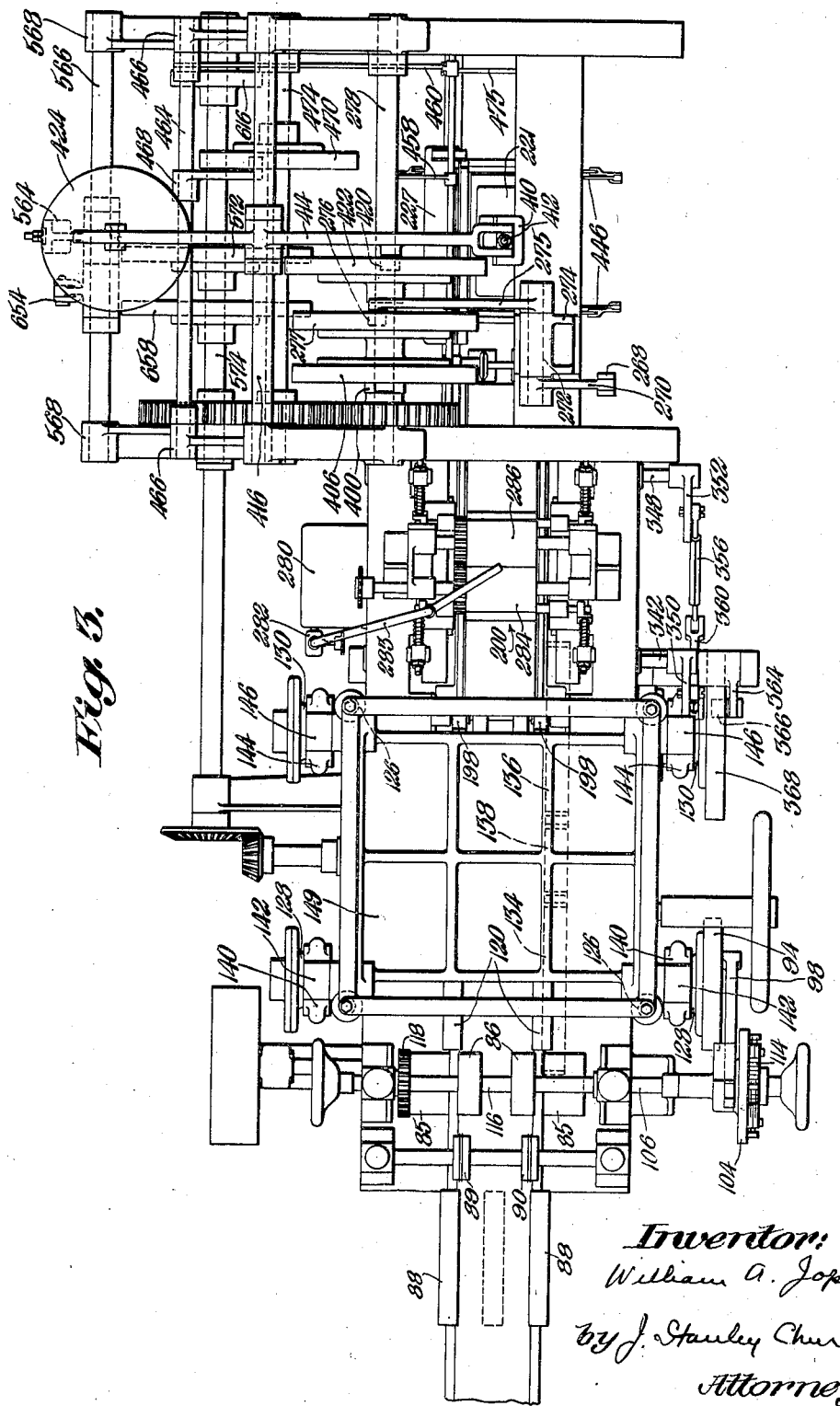

May 6, 1930. W. A. JOPLIN 1,757,804
BOX MAKING MACHINE
Filed Sept. 3, 1927 12 Sheets-Sheet 3

Inventor:
William A. Joplin
by J. Stanley Churchill
Attorney.

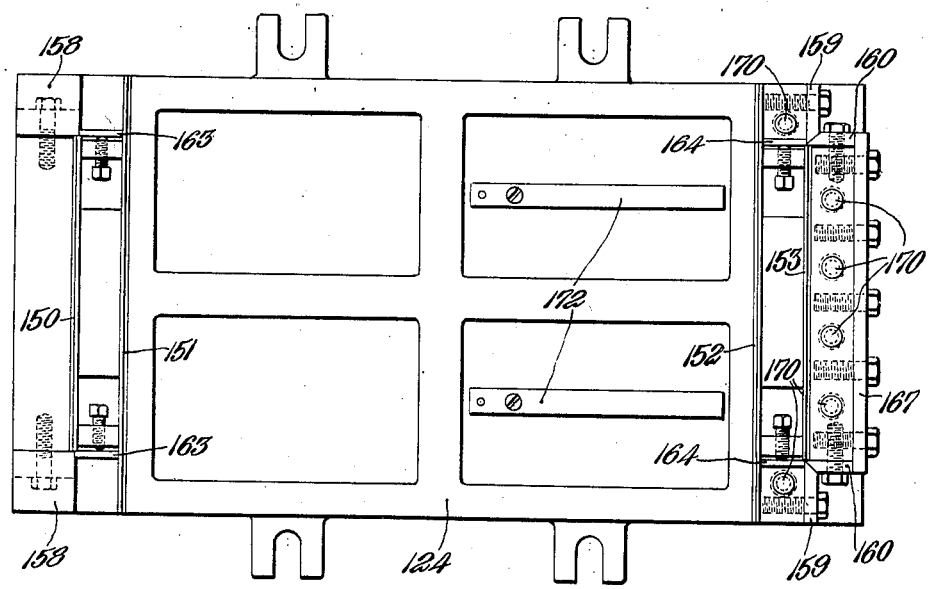
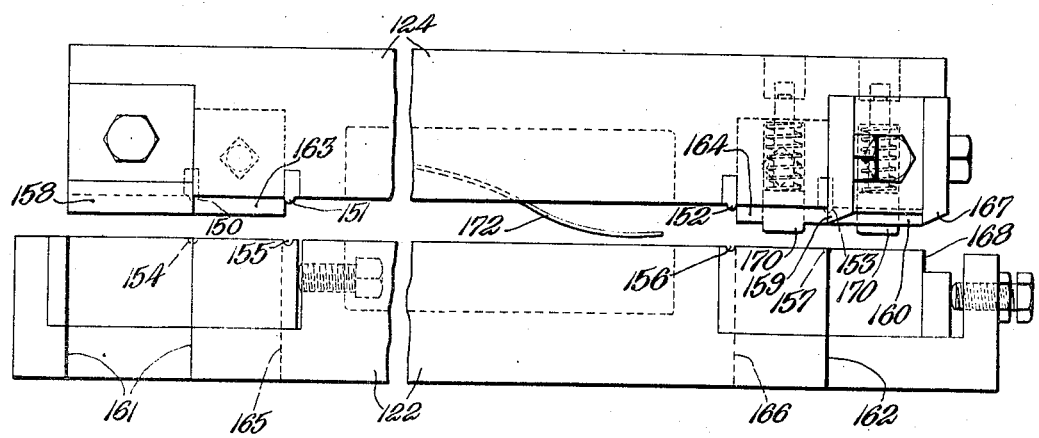

May 6, 1930. W. A. JOPLIN 1,757,804
BOX MAKING MACHINE
Filed Sept. 3, 1927 12 Sheets-Sheet 5
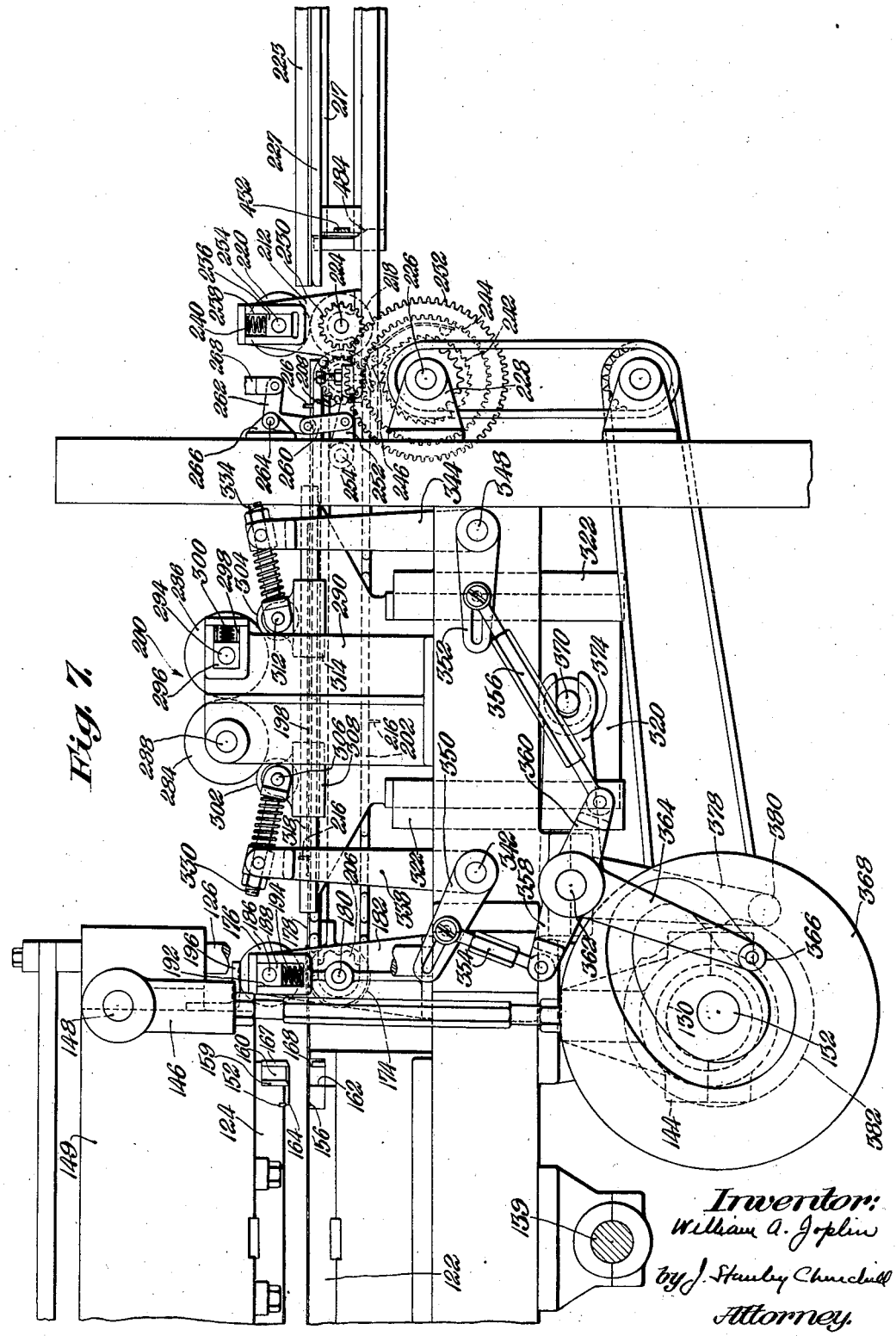
Inventor:
William A. Joplin
By J. Stanley Churchill
Attorney.

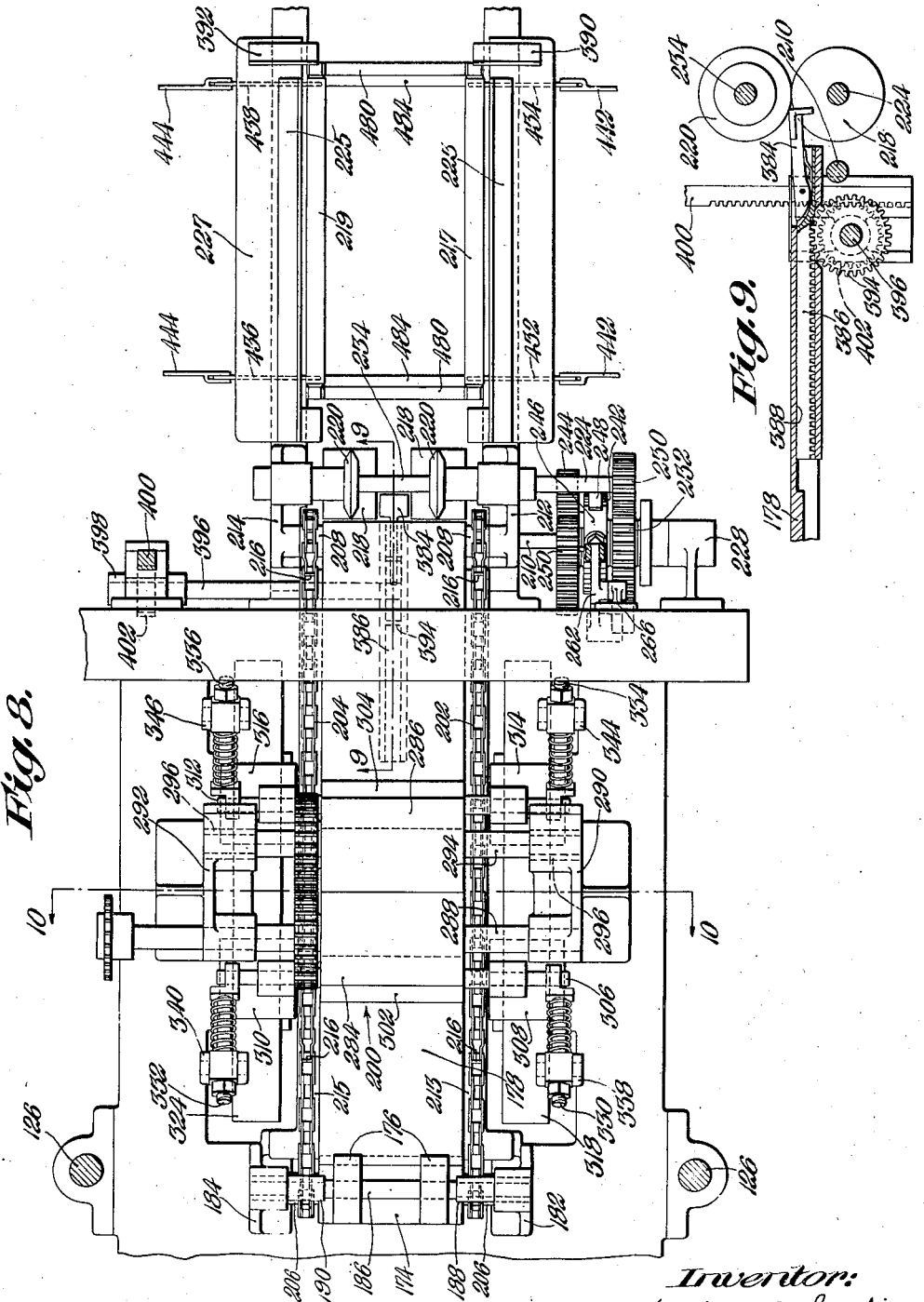

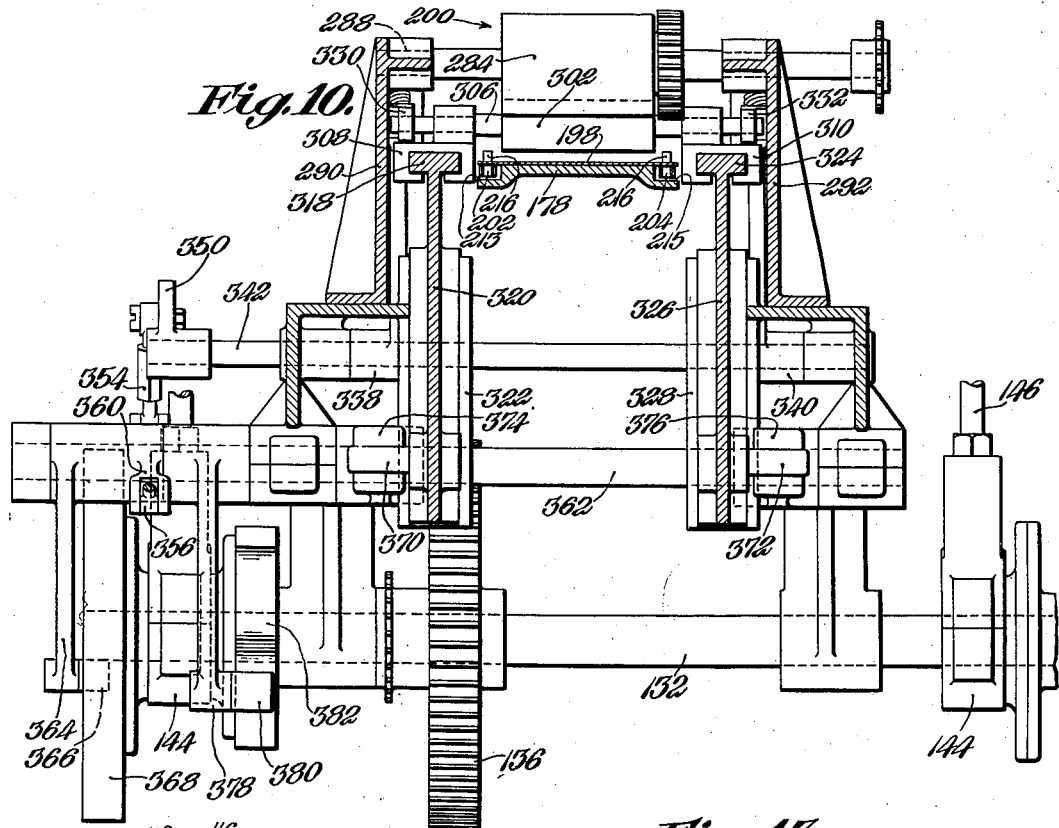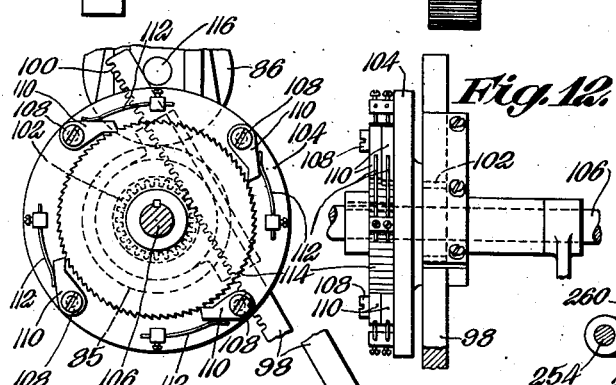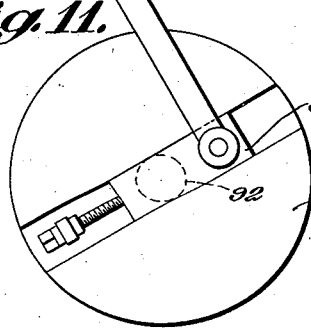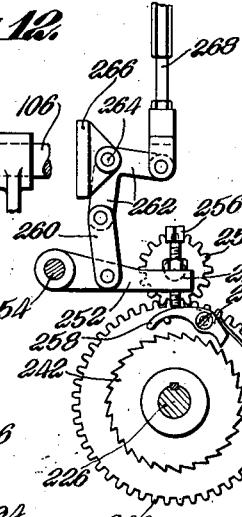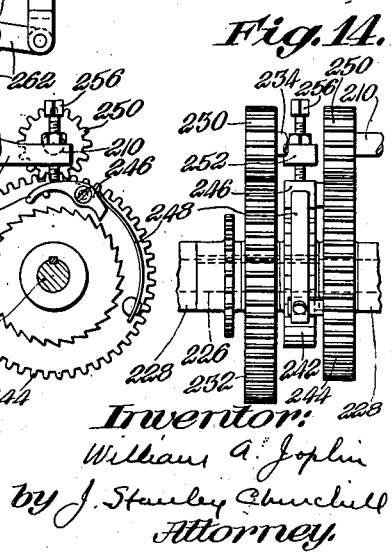

May 6, 1930.   W. A. JOPLIN   1,757,804
BOX MAKING MACHINE
Filed Sept. 3, 1927   12 Sheets-Sheet 8
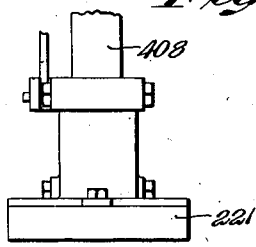
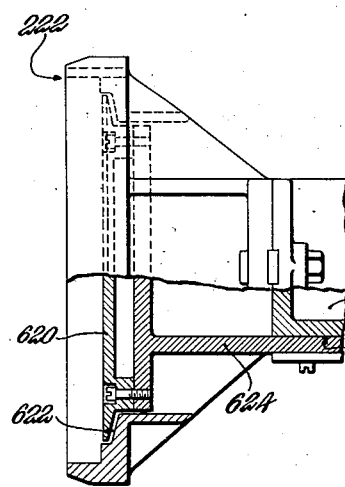
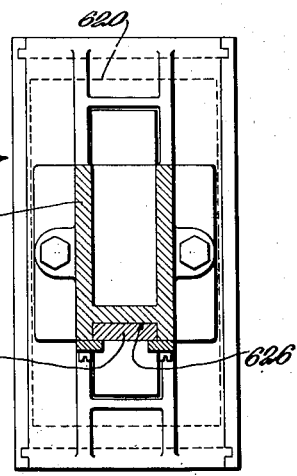
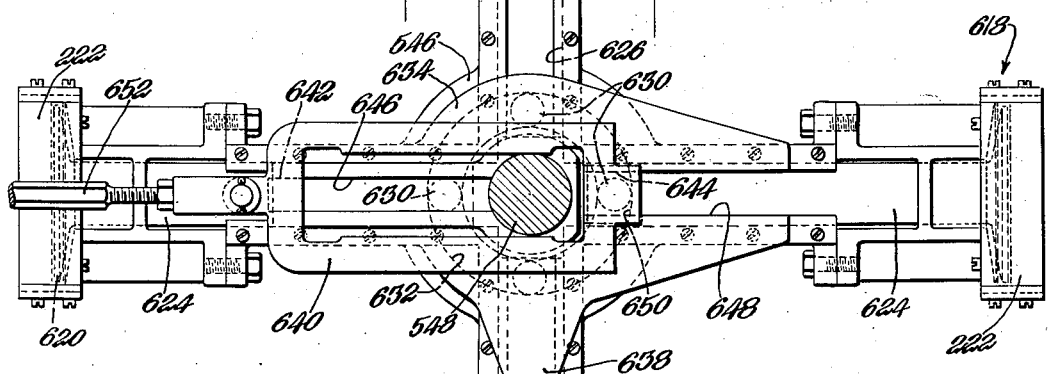
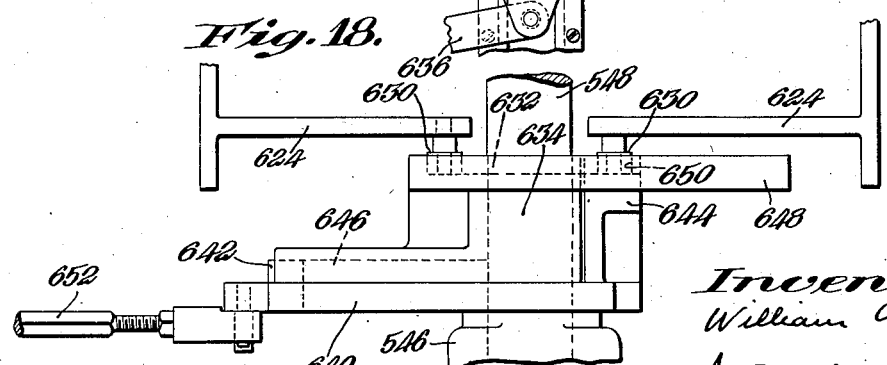
Inventor
William A. Joplin
by J. Stanley Churchill
Attorney.

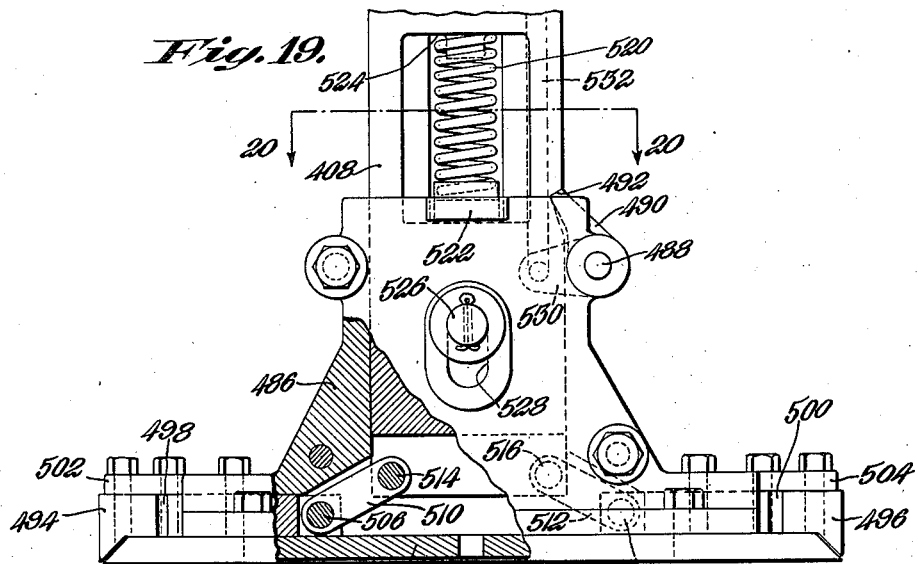
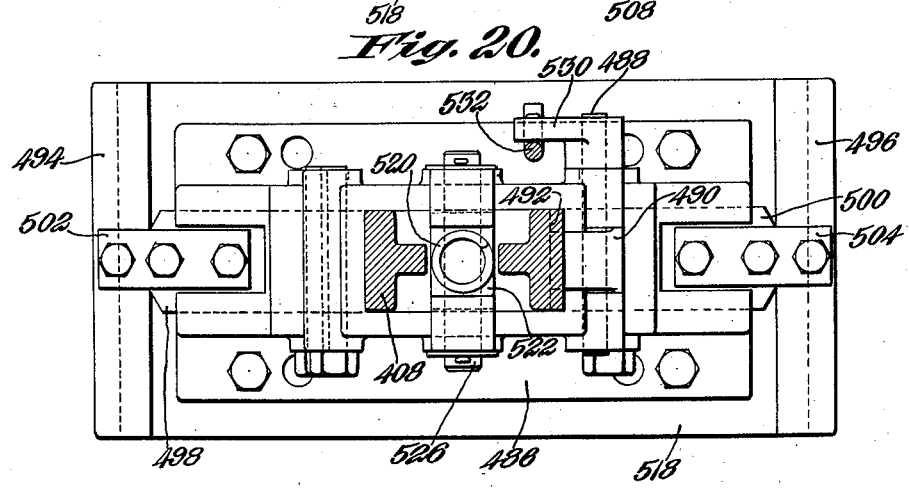
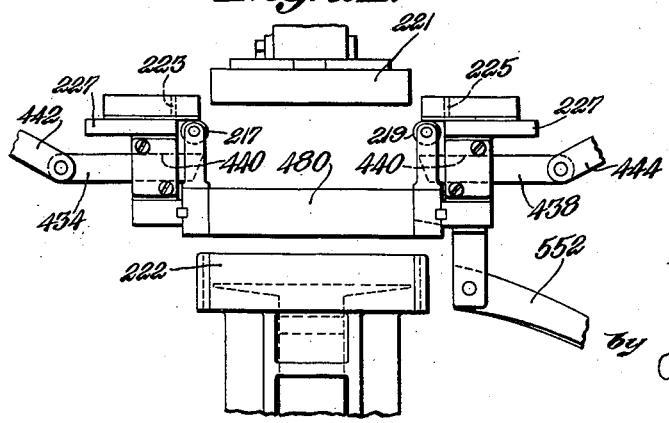

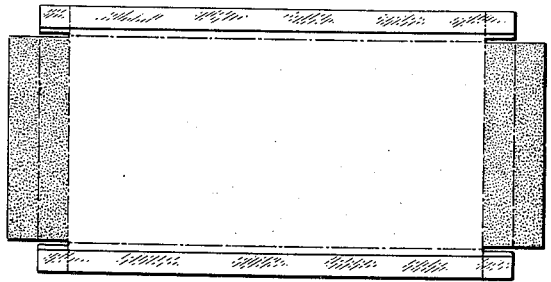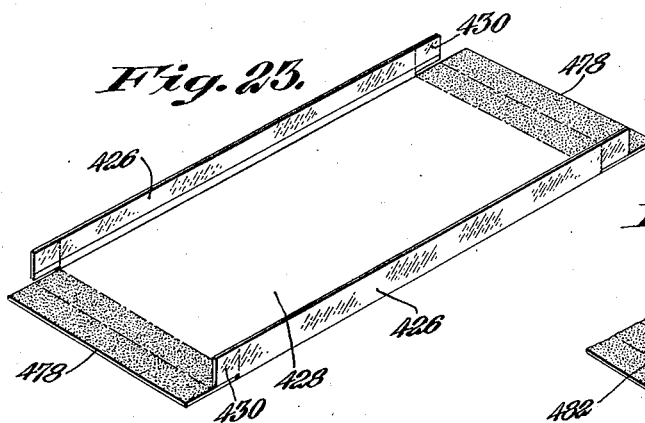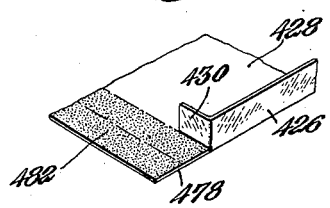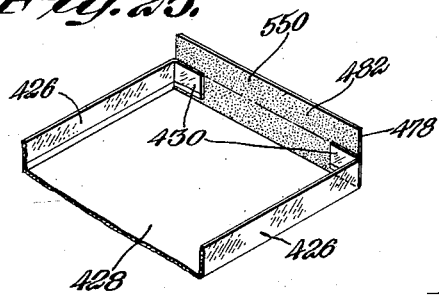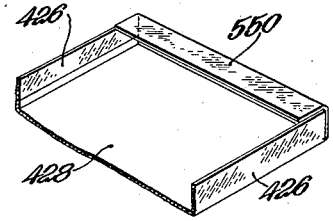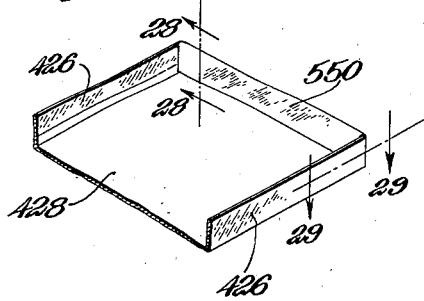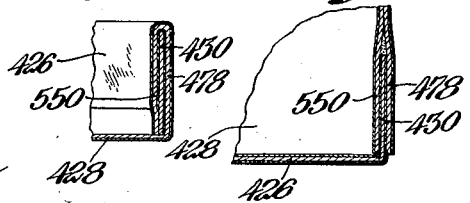

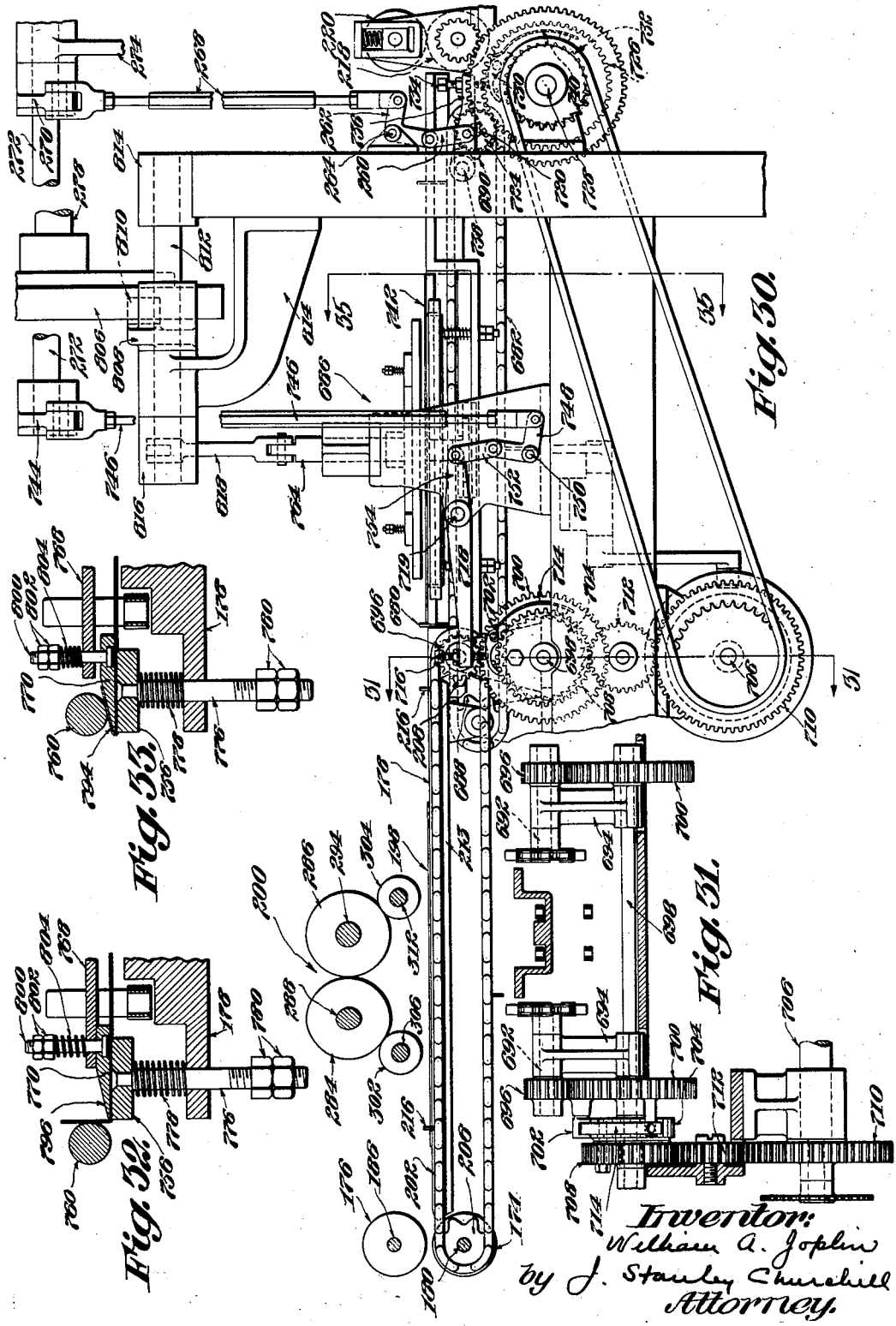

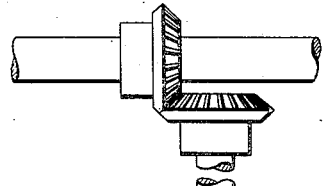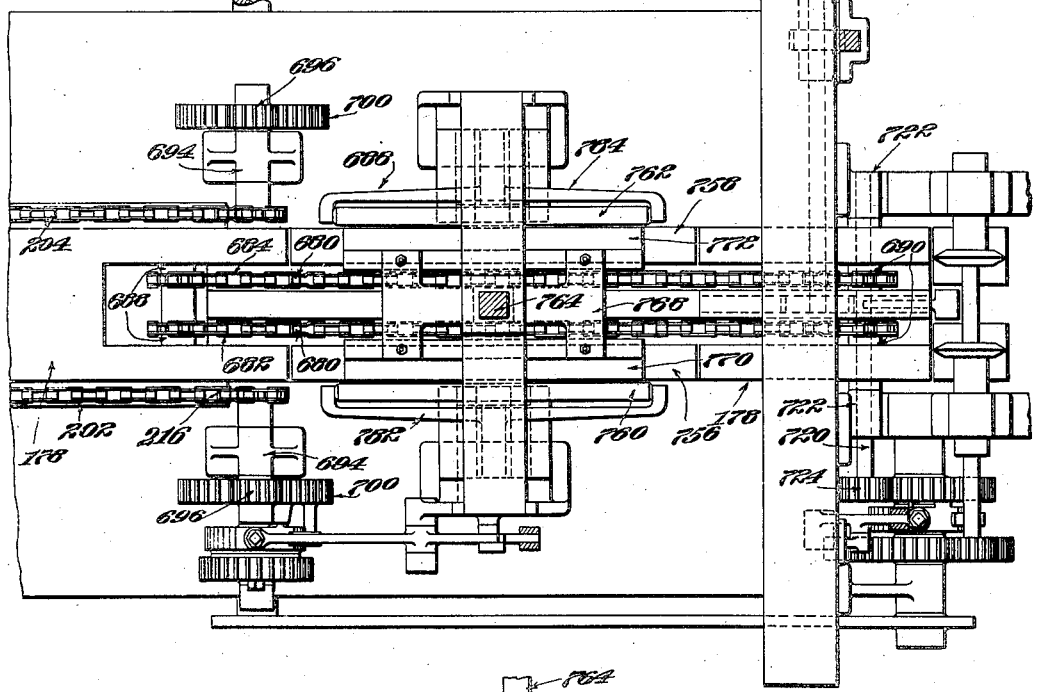

Patented May 6, 1930.

1,757,804

UNITED STATES PATENT OFFICE

WILLIAM A. JOPLIN, OF NORFOLK DOWNS, MASSACHUSETTS, ASSIGNOR TO PNEUMATIC SCALE CORPORATION, LIMITED, OF QUINCY, MASSACHUSETTS, A CORPORATION OF MASSACHUSETTS

BOX-MAKING MACHINE

Application filed September 3, 1927. Serial No. 217,450.

This invention relates to a box making machine.

In general, the invention has for an object to provide a box making machine of novel and improved construction which is adapted for the economical, rapid and superior manufacture of paper or like boxes or covers.

More specifically the invention has for an object to provide a novel and highly efficient automatic machine for the economical manufacture of paper boxes or covers of the type having a double end wall construction formed by folded over end pieces formed as an integral part of the body portion of the box or cover.

With these objects in view and such others as may hereinafter appear, the invention consists in the machine and in the structures, arrangements and combinations of parts hereinafter described and particular defined in the claims at the end of this specification.

In the drawings, Figure 1 is a plan view of the mechanism for applying cover paper to the cardboard strip; Fig. 2 is a diagrammatic side elevation thereof; Fig. 3 is a plan view of the blank forming, gluing, and box forming portions of the machine; Fig. 4 is a front end elevation of the machine; Fig. 5 is a bottom plan view of the upper die member used in forming and creasing the blanks; Fig. 6 is a side elevation of the upper and lower die members; Fig. 7 is a partial side elevation of the machine showing the gluing mechanism and associated parts; Fig. 8 is a plan view of the parts shown in Fig. 7; Figs. 9 and 10 are sections taken on the lines 9—9 and 10—10 of Fig. 8; Figs. 11 and 12 are details showing the mechanism controlling the feed of the cardboard strip into the blank forming mechanism; Figs. 13 and 14 are details of the clutch controlling the feed of blanks through the gluing device; Fig. 15 is a detail in rear elevation of the spider and associated parts forming part of the box forming mechanism; Fig. 16 is a side elevation, partly in section, of one of the pockets carried by the spider; Fig. 17 is a section on the line 17—17 of Fig. 15; Fig. 18 is a plan view of a portion of the mechanism shown in Fig. 15; Fig. 19 is a side elevation, partly in section, of one of the plungers forming part of the mechanism shown in Fig. 15; Fig. 20 is a sectional plan taken on the line 20—20 of Fig. 19; Fig. 21 is a detail of a portion of the box forming mechanism; Figs. 22 through 29 are views illustrating the details of construction of the box forming blank and the manner of folding the sides, end members and end tabs to form the completed box or cover and which will be hereinafter referred to. Fig. 30 is a partial side elevation of a modified form of box making machine; Fig. 31 is a cross-sectional view taken on the line 31—31 of Fig. 30; Figs. 32 and 33 are detail views illustrating the operation of the modified form of box making machine; Fig. 34 is a plan view of the parts shown in Fig. 30; and Fig. 35 is a cross-sectional view taken on the line 35—35 of Fig. 30.

The different features of the present invention are herein illustrated as embodied in an automatic machine for producing a paper box or cover of the construction illustrated in Figs. 22 through 29 of the drawings hereof, although it is to be understood that viewed in the broader aspects of the invention certain features, as will be pointed out, may be embodied in a machine for producing paper boxes or covers of other constructions.

In general, in the present box forming machine, provision is made for automatically folding the side members of the body portion of the box or cover blank at right angles to the body portion of the box or cover and for folding in the end tabs at right angles to the side members. Provision is also made for over-folding end members formed integrally upon the body portion of the box or cover and for adhesively securing the end members to the inner face of the end tabs and preferably for adhesively securing the adjacent contacting faces of the folded portions of the end members themselves, thus forming a double end wall construction for the box or cover. The box or cover is preferably covered with finishing material such as white or colored paper, and the finishing material is preferably applied to the box or cover blanks prior to the formation thereof into the completed box or cover, as will be described. The illustrated machine also has provision for forming the box or cover blanks from a web of the box forming material and the entire machine is preferably arranged to operate automatically, requiring minimum attention, whereby the finished boxes or covers may be rapidly and economically produced by the machine from supply rolls of the box forming material and finishing material respectively.

Referring to the drawings, in the illustrated machine, provision is made for withdrawing a web of the box or cover forming material and a web of the finishing material, such as white or colored paper, from supply rolls 32, 46 of such materials, and for adhesively affixing the strip of finishing material to the strip of box forming material, in a manner such as to cover one surface thereof and to fold marginal portions of the finishing strip over the side edges of the strip of box or cover forming material to impart a finished appearance to such edges. As shown in Figs. 1 and 2, the cardboard strip 30 from which the blanks are to be formed is drawn from a supply roll 32 by means of feed rolls 34 and 36 through a straightening device indicated at 38 and through pressure rolls 40 and 42. At the same time the feed rolls 34 and 36 draw from a supply roll 46, a strip 44 of the finishing material, which may comprise white or colored paper for imparting a finished appearance to the box or cover. The strip 44 passes around guide rolls 48, 50 and 52 over an adhesive applying roll 54, which coats one side of it with an adhesive, such as glue, around a guide roll 56 to a stripping device 58 which removes the excess glue or adhesive, and then around guide rolls 60 and 62 and between the pressure rolls 40 and 42 which affix the strip of paper or other finishing material to the cardboard strip. As shown in Fig. 1, the finishing strip 44 is applied to the bottom of the cardboard strip 30 with its outer edges extending somewhat beyond the outer edges of the strip 30 and these overhanging portions of the finishing strip are engaged, after passing through the pressure rolls, first by fixed folding plates 64 and 66 which fold them upwardly at right angles and about the edges of the cardboard and then by folding rolls 68 and 70 which turn these upstanding folds down to the upper face of the cardboard strip and affix them to it, in the manner illustrated. The feed rolls 34 and 36 are driven from a driven vertical shaft 72 through a friction wheel 74 splined thereto, and arranged to drive a friction disk 76 fixed to a shaft 78 upon which a pinion 80 is mounted. The pinion 80 drives the gears 82 which are fixed to the shafts carrying the feed rolls 34 and 36. The speed at which the feed rolls are driven may be accurately adjusted by varying the position of the wheel 74 on the shaft 72 by means of a hand wheel 84, thus adjusting the position at which the wheel 74 engages the friction disk 76 to thereby vary the speed of the latter.

After passing through the feed rolls 34 and 36, the paper covered cardboard strip 30 is drawn by intermittently driven feed rolls 85 and 86 through guides 88 and two sets of creasing rolls 89 and 90 which crease the strip at the places where the folds between the top and sides of the box or cover are to occur. (See Fig. 3.)

It is desirable that the intermittently driven feed rolls 85 and 86 function to feed the cardboard strip 30 an amount exactly equal to the length of one of the blanks each time they are driven, and to secure this result provision is made for driving them in a manner such that no lost motion will occur, and by mechanism which affords accurate adjustment. To this end a crank disk 94 is mounted upon a constantly driven shaft 92 and a block 96 (see Figs. 3, 11 and 12) is adjustably secured to the crank disk 94. A link 98 is pivotally secured at one of its ends to the block 96 and on its other end, has formed a rack 100 which oscillates a pinion 102 secured to a clutch disk 104 loosely mounted on the shaft 106. The bottom feed roll 85 is secured to the shaft 106. Pivoted on pivots 108 spaced 90° apart on the disk 104 near the periphery thereof are four sets of pawls 110 which are held by springs 112 in engagement with the teeth of a ratchet wheel 114 secured to the shaft 106. There are two pawls on each of the pivots 108 and each of the eight pawls is made of a slightly different length, and as the teeth of the ratchet wheel 114 are small this insures one of the pawls being in engagement with one of the teeth of the ratchet at any position of the disk 104 so that each time this disk 104 is oscillated in a clockwise direction, viewing Fig. 11, by power derived from the driven shaft 92, through the connections described, the ratchet wheel 114, shaft 106 and feed roll 85 will be fed through the same angle in the same direction, thus insuring a uniform feed of the feed roll 85 for any adjustment of the block 96 and one in which practically no lost motion can occur. In order that the feed roll 86 may at the same time be positively driven through the same angle in the opposite direction to feed the cardboard strip, the shaft 116 to which the two sections comprising the roll 86 are secured, is driven from the shaft 106 by gearing indicated at 118 in Fig. 3.

By the operation of the mechanism thus far described, a strip of cover or box forming material such as cardboard is provided with finishing material covering its bottom surface and with its side edges finished by the lapped over portions of the finishing strip. Provision is then made for feeding the strip in this condition into a position to be operated upon by mechanism for forming therefrom a box or cover blank of the construction illustrated in Fig. 22. The blank forming mechanism is illustrated herein as comprising two die members, 122, 124, which serve not only to form the successive individual blanks from the cardboard strip with the finishing material applied thereto, but also serve to crease the blanks transversely at the places where the folds are to occur, and in addition the die members serve to sever the formed and creased blank from the strip.

As illustrated in Figs. 3, 5, 6 and 7, after the cardboard strip has passed through the feed rolls 85, 86, it is fed through guides 120 to the top of the fixed lower die member 122. The upper die member 124 is mounted to slide vertically on posts 126 and is reciprocated from shafts 92 and 132, the latter being driven from the shaft 92 by cooperating gears 134, 136, an idler gear 138 and a shaft 139, through the medium of two pairs of eccentrics 128 and 130 on the shafts 92 and 132 respectively. The eccentrics 128 are embraced by eccentric straps 140 formed on the lower ends of links 142, and the eccentrics 130 are embraced by strips 144 on the lower ends of links 146, the upper ends of the links 142 and 146 being pivotally secured at 148 to the block 149 which carries the upper die member 124.

In order to form the proper creases in the box or cover blanks as the latter are successively formed by the cooperating upper and lower die members 122, 124, these members are provided with creasing members and grooves respectively, shown in Figs. 5 and 6, and comprising the creasing members 150, 151, 152, 153, and the grooves 154, 155, 156, 157. The die members are also provided with cutter members 158, 159, and 160, and with grooves 161 and 162 (Figs. 5 and 6). In addition cutter members 163 and 164 are provided on the right and left ends respectively of the die member 124 which cooperate with recesses 165 and 166 in the die member 122 to separate the tabs on the side members from the end members.

The die members 124, 122, are also provided with cooperating cutter members 167 and 168 which serve to sever each blank from the cardboard strip on the next cycle of the machine after the blank has been formed. The upper die member 124 is provided with downwardly spring pressed stripper members 170 in order to prevent the end of the cardboard strip from sticking to the upper cutter members 159, 160, 164 and 167 after a blank has been severed, and thus interfering with the proper feeding of the strip. The upper die member 124 is also provided with spring fingers 172 in order that the end of the strip may be threaded through the space between the upper and lower die members without catching on the cutters 159, 160, 164 and 167 and the strippers 170.

After each blank has been formed in the manner above described and servered from the cardboard strip, provision is then made for applying glue or other adhesive to the end members of the blank and for feeding the blank to mechanism for forming it into the box or cover. To this end, in the illustrated machine, a transfer mechanism is provided which feeds each blank in turn from the blank forming dies to a gluing mechanism and at the same time feeds the preceding blank from the gluing mechanism to the box forming mechanism.

This transfer mechanism may be described as follows: The cardboard strip, having the box or cover blank formed on the end thereof, and before the blank has been severed from the strip, is caused to pass through a pair of feed rolls 174 and 176 which operate to feed it onto a table 178, (Figs. 7, 8 and 10). The roll 174 is secured on a shaft 180 rotatably mounted in fixed brackets 182 and 184 and the roll 176 is secured to a shaft 186 rotatably mounted in blocks 188 and 190, the latter being mounted in vertical slideways 192 formed in the brackets 182 and 184. Springs 194 positioned between the lower side of the blocks 188 and 190 and the bottom of the slideways 192 normally withhold the roll 176 from contact with the roll 174 and allow the end of the cardboard strip to be fed between said rolls. When, however, the upper die member 124 descends to sever the blank from the strip, pusher members 196 secured to the block 149 engage the blocks 188 and 190 and move the roll 176 downwardly to engage the blank between said roll and the roll 174. The roll 174 is rotating at this time, and when the blank is severed from the strip the feed rolls 174 and 176 feed it to the right, viewing Figs. 7 and 8, until its rear end passes beyond the point of contact of said rolls. From this position the blank is fed along the table 178 to the position indicated at 198 in Figs. 7 and 10 beneath a gluing mechanism 200, (Figs. 3, 7, 8 and 10), the operation of which will be explained in detail later.

The mechanism for moving the blank beneath the gluing mechanism 200, includes parallel conveyor chains 202 and 204 engaging sprockets 206 secured to the shaft 180 and sprockets 208 secured to a shaft 210 journalled in fixed brackets 212 and 214. The conveyor chains 202 and 204 are positioned under the side members of the blank, being supported in guideways 213 and 215 formed in the table 178 and are provided with blank engaging fingers 216, arranged to engage the ends of the tabs on the side members of the blank to feed the latter along the table 178. At the same time that a blank is fed into position beneath the gluing mechanism 200 by one pair of feeding fingers 216, the preceding blank is fed by the preceding pair of feeding fingers through a pair of feed rolls 218 and 220 which feed it onto the folding rolls 217 and 219 of the box forming mechanism, under a block 221 and over a pocket 222, the blank being positioned laterally between guide members 223 and 225 secured to the table 227 of the box forming mechanism, (see Figs. 4, 7, 8 and 21). The feed roll 218 is secured to a shaft 224 journalled in the brackets 212 and 214, and is rotated from a constantly driven shaft 226 journalled in brackets 228, by means of gears 230 and 232 secured to the shafts 224 and 226, respectively. The roll 220 is secured to a shaft 234 journalled in blocks 236 mounted in slideways 238 formed in the brackets 212 and 214 and springs 240 taking between the blocks 236 and the top of the slideways 230 urge the roll 220 downwardly against the roll 218.

Provision is made for intermittently rotating the shaft 210 to impart to the conveyor chains 202 and 204 and the blanks carried thereby the above described movements. For this purpose the shaft 210 is intermittently rotated by means of a ratchet wheel 242 secured to the constantly rotating shaft 226, and a gear 244 rotatably mounted on said shaft 226 adjacent the ratchet wheel 242, having pivotally mounted thereon a pawl 246 yieldingly held in engagement with the ratchet 242 by a leaf spring 248. A gear 250 secured to the shaft 210 meshes with the gear 244, (see Figs. 7, 8, 13 and 14). The shaft 210 and chains 202 and 204 are therefor driven whenever the pawl 246 is in engagement with the ratchet 242, and provision is made for controlling the engagement of the pawl with the ratchet to impart the desired movements to the chains 202, 204. To this end, an arm 252 is pivoted at one end on a fixed pivot 254 and carries on its other end an adjustable stop screw 256 which is arranged to normally engage a tail piece 258 formed on the pawl 246 to hold said pawl out of engagement with the ratchet 242. The stop screw is arranged to be lifted out of the path of the tail piece 258 of the pawl to allow the latter to engage the ratchet and start the feed of the blanks, and to be thereafter lowered into position to engage the tail-piece of the pawl, to disengage said pawl from the ratchet after the gear 244 which carries the pawl, has made one revolution. The parts of the machine are so proportioned that when the gear 244 is rotated through one revolution, the chains 202 and 204 are fed through a distance exactly equal to the distance between successive feeding fingers 216 which results in successive blanks being presented to the gluing mechanism in exactly the same relation. The position of the arm 252 and stop screw 256 is controlled by a link 260 pivotally secured at its lower end to the arm 252 and at its upper end to the vertical arm of a bell crank lever 262, pivoted at 264 to a fixed bracket 266. The horizontal arm of the bell crank lever is pivotally secured to the lower end of a link 268 itself pivotally secured at its upper end to one end of a lever 270, the other end of which is secured to a rock shaft 272 journalled in a fixed bracket 274, (Figs. 3 and 4). A cam arm 275 is also secured to the shaft 272 and carries a cam roll 276 engaging a cam groove formed in a cam 277 secured to a shaft 278. The shaft 278 is rotated at the same speed as the shafts 92 and 132.

After a blank has been fed to position beneath the gluing mechanism 200, the latter operates to apply glue to the end members of the blank. The gluing mechanism 200 includes a supply tank 280 from which the glue is pumped by a pump 282 and discharged through a pipe 283 between a pair of constantly rotating distributing rolls 284 and 286, (Fig. 3). The distributing roll 284 is secured to a shaft 288 journalled in fixed brackets 290 and 292 and the roll 286 is secured to a shaft 294 journalled in blocks 296 mounted in slideways 298 formed in said brackets 290 and 292, the roll 286 being urged against the roll 284 by springs 300 mounted between said blocks and a fixed portion of the brackets.

In order to transfer the glue from the distributing rolls 284, 286 to the desired portions of the blanks, glue rolls 302 and 304 are arranged to contact with the distributor rolls 284 and 286, respectively, during a portion of the cycle of operations of the machine to be coated with glue thereby and the glue rolls are thereafter moved into contact with the end members of a blank which has been moved beneath the gluing mechanism, to thereby apply the glue to said end members of the blank. The glue roll 302 is secured to a shaft 306 journalled at its opposite ends in slide members 308 and 310, and the glue roll 304 is secured to a shaft 312 similarly journalled in slide members 314 and 316. The slide members 308 and 314 are slidably mounted on a horizontal slideway 318 formed on a slide member 320 arranged to slide in fixed vertical slideways 322, and the slide members 310 and 316 are slidably mounted on a horizontal slideway 324 formed on a slide member 326 arranged to slide in a fixed vertical slideway 328. The glue rolls 302 and 304 normally occupy the positions shown in Fig. 7 above the blank 198 and inside of the end members of said blank. Provision is made for moving the slide members 308 and 310 to the left and the slide members 314 and 316 to the right, viewing Figs. 7 and 8, until the centers of the rolls 302 and 304 are in line with the outer edges of the end members of said blank. When the rolls reach a position over the inner edges of the end members, provision is made for lowering the slides 320 and 326 until the glue rolls 302 and 304 contact with the end members of the blank, and during the remainder of their outward movement, the glue rolls roll along the surfaces of said end members and transfer to them some of the glue which they previously received from the distributor rolls. When the glue rolls reach the outer ends of the end members, the slides 320 and 326 are raised to lift said rolls, and thereafter the slides 308, 310, 314 and 316 are moved inwardly to return the rolls 302 and 304 to their normal positions in contact with the distributor rolls 284 and 286.

In order to impart horizontal movement to the glue rolls 302 and 304, links 330 and 332 are pivotally connected at their inner ends to the shaft 306, and links 334 and 336 are similarly connected to the shaft 312. The outer ends of the links 330 and 332 are pivotally connected to the upper ends of levers 338 and 340 secured at their lower ends on a rock shaft 342, and the outer ends of the links 334 and 336 are in a similar manner connected to the upper ends of levers 344 and 346 secured at their lower ends to a rock shaft 348. In order to rock the shafts 342 and 348, arms 350 and 352 are secured thereto which are connected by links 354 and 356 to two arms 358 and 360 of a T-shaped cam lever pivotally mounted on a shaft 362. The third arm 364 of the T lever carries a cam roll 366 arranged to engage a cam groove formed in a cam 368 secured to the constantly rotating shaft 132.

To impart the desired vertical movement to the glue rolls 302 and 304, studs 370 and 372 secured to the slides 320 and 326 are engaged by the forked ends of levers 374 and 376 which are secured at their opposite ends to the shaft 362. A cam lever 378 is also secured at its upper end to the shaft 362 and carries on its lower end a cam roll 380 arranged to engage the surface of a cam 282 secured to the shaft 132.

It may be seen from Figs. 7 and 8 that the feed rolls 218 and 220 will not feed the blanks entirely into the desired position between the block 221 and the pocket 222 of the box forming mechanism, and in order to transfer the successive blanks into the correct position with relation to these parts, an upwardly spring pressed pusher finger 384 pivotally mounted in the forward end of a rack 386 slidably mounted in a slideway 388 formed in the bottom of the table 178, is arranged to engage the rear end of the blank after the rolls 218 and 220 have ceased to feed it, and to push it forwardly along the folding rolls 217 and 219 of the box forming mechanism until the tabs on the forward end of the side member engage fixed stops 390 and 392 secured to the table 227 of the box forming mechanism. The rack 386 is reciprocated by a pinion 394 secured to a shaft 396 journalled in brackets 398 and rocked by the engagement of a vertical rack 400 with a second pinion 402 also secured to the shaft 396. The rack 400 is forked at its upper end to straddle the shaft 278 and has secured to it a cam roll 404 arranged to engage a cam groove formed in a cam 406 secured to said shaft (Figs. 3 and 4).

From the description thus far it will be observed that in the illustrated machine the box or cover blanks, having their outer surfaces and side edges covered with finishing material, are successively formed from rolls of cardboard and finishing paper; and after each blank has been severed from the web, the unfinished surfaces of the end members thereof are coated with glue and the blank is fed to a definite position on the folding rolls 217 and 219 of the box forming mechanism under the block 221 and over a pocket 222. The block 221 is then caused to descend to force the blank into the pocket and form the box or cover. The block 221 is mounted on the lower end of a vertical plunger 408 mounted in fixed slideways 440 and having pivoted to its upper end, a link 412 by which it is connected to a cam arm 414, pivotally mounted on a shaft 416 secured in fixed brackets 418. The cam arm has pivoted to it a cam roll 420 and the cam roll 420 engages a cam groove formed in a cam 422 secured to the shaft 278. A counter-weight 424 is secured to the end of the cam arm 414 remote from the plunger 408 for counterbalancing.

The table 227 of the box forming mechanism is made in two separated sections in order to allow the block 221 to descend therebetween and into the pocket 222. The folding rolls 217 and 219 are made of a length slightly greater than the cover being formed and are mounted on parallel axes adjacent the separated sections of the table 227 with the distance between their inner edges exactly equal to the width of the box or cover being formed. As a result, when the block 221 descends, it engages the portion of the blank from which the top of the cover is to be formed and the portions from which the sides are to be formed are engaged by the rolls 217 and 219 and turned upwardly at right angles to the body portion at the previously formed creases. The blank is at this time in the condition illustrated in Fig. 23 with the side members 426 folded up at right angles to the body portion 428.

As the block continues to descend and before it enters the pocket, provision is made for folding the tabs 430 formed on the ends of the side members 426 inwardly as illustrated in Fig. 24. For this purpose, folding fingers 432, 434, 436 and 438 are provided, being slidably mounted in fixed slideways 440. The folding fingers normally occupy the position illustrated in Figs. 4 and 21 with their inner ends beneath the ends of the rolls 217 and 219 and out of the path of the descending blank. As the blank is moved downwardly, however, and as soon as the body portion thereof has passed beneath the folding fingers the latter are moved inwardly to engage the tabs 430 and fold them inwardly to the position shown in Fig. 24. The movement of the folding fingers is effected through links 442, 444 pivotally secured to the lower ends of arms 446, 452 secured at their upper ends to rock shafts 448, 454 journalled in fixed brackets 450, 456 respectively. In order to rock the shafts 448 and 454 to operate the folding fingers, an arm 458 is secured to the shaft 454 and has pivotally secured to its lower end, one end of a link 460. The other end of the link 460 is pivotally secured to one end of an arm 462 secured to a shaft 464 journalled in fixed brackets 466. The shaft 464 also has secured to it a cam arm 468 provided with a cam roll 470 arranged to engage a cam path formed in a cam 472 secured to a shaft 474, the latter being journalled in the brackets 466 and constantly rotating at the same speed as the shaft 278 (Fig. 4). The arm 458 is pivotally secured to one end of a link 475 secured to the upper end of an arm 476 mounted upon the rock shaft 448. By means of the mechanism described, when the shaft 454 is rocked in one direction to move the fingers 436 and 438 in either direction, the shaft 448 is rocked through the same angle in the opposite direction to move the fingers 432 and 434 the same distance in the opposite direction.

After the folding fingers have operated in the manner described to fold the tabs 430 inwardly, the plunger 221 continues to descend and the end members 478 of the blank are engaged by fixed end folders 480 and folded upwardly until their adhesive upper surfaces 482 engage the outer surfaces of the tabs 430, as shown in Fig. 25. The end folders 480 are formed with bevelled folding faces 484 in order that the end members may be folded up gradually to permit the folding fingers which have previously folded in the tabs 430 on the side members to be withdrawn while the end members are being folded up, and to prevent the adhesive surface of said end members from engaging said folding fingers.

In the continued operation of the machine the block 221 continues to descend, after the end members have been folded up in the manner described, and carries the blank, which has thus been folded in the manner indicated in Fig. 25, with it into the pocket 222. When the block reaches the bottom of the pocket, provision is made for expanding the block endwise to press the tabs 430 firmly against the end members 478. For this purpose the plungers 408 is arranged to descend relative to the block 221 after the latter has reached the bottom of the pocket and this movement is utilized to expand the block endwise. As herein shown the body portion 486 of the block is slidably mounted on the lower end of the plunger and has jornalled in it a shaft 488 to which is secured a pawl 490 normally engaging a notch 492 formed in the plunger 408 (see Fig. 19). The end plates 494 and 496 of the block are secured to the outer ends of slide members 498 and 500 by means of tie members 502 and 504. The slide members 498 and 500 are mounted to slide horizontally in slideways formed in the body portion 486 of the block and are pivotally secured at their inner ends at 506 and 508 to one end of obliquely disposed links 510 and 512 pivoted at their other ends at 514 and 516 in the lower end of the plunger 408. A bottom plate 518 is secured to the body portion 486 of the block, and a coil spring 520 interposed between a spring seat 522 secured to the body portion 486 and a seat 524 formed in the plunger 408, tends to urge the body portion and bottom plate downwardly until a pin 526 secured to the plunger 408 is engaged by the top of a slot 528 formed in said body portion of the block. In order to permit the plunger 408 to descend, as above described, after the block 221 has reached the bottom of a pocket, so as to cause the end plates 494, 496 to be pushed outwardly by the links 510, 512 as the plunger descends, provision is made for disengaging, at this time, the pawl 490 carried by the block from the notch 492 in the plunger. To accomplish this, an arm 530 is secured to the shaft 488 to which is pivotally connected the lower end of a link 532, the upper end of which passes through a hole in a shelf 534 secured to the slideway 410 (Fig. 4). A nut 536 threaded on the upper end of the link 532 engages the top of the shelf 534 to rock the shaft 488 and disengage the pawl 490 from the notch 492 at the desired time.

In order that the pressure applied by the plunger 408 and block 221 to the bottom and ends of the cover in the pocket 222 may be a yielding one, a yielding connection is provided between the cam arm 414 and the link 412. As herein shown, a coil spring 538 is interposed between a shoulder 540 on the link 412 and a block 542 pivotally mounted in the forked end of the cam arm 414, and surrounding the portion of the link between said block and said shoulder. Nuts 544 are threaded onto the link 412 on the side of the block 542 opposite said spring to regulate the tension in said spring.

During the first part of the upward movement of the plunger 408 the links 510 and 512 pull inwardly on the slides 498 and 500 relieving the pressure of the end plates on the ends of the pocket and then the block 221 starts to rise with the plunger and the pawl 490 returns to engagement with the notch 492 and remains there during the rest of the upward movement and until tripped again near the end of the next downward movement of the plunger 408, in a succeeding cycle of operations of the machine.

In the illustrated machine the pockets 222 in which the boxes or covers are formed, are four in number and are herein shown as located 90° apart on the periphery of a spider 546 fixed to an intermittently rotatable shaft 548. After the plunger 221 has been withdrawn from the pocket leaving a partially formed box or cover therein with its ends in the condition illustrated in Fig. 25, the spider 546 carrying said pocket is rotated 90°. At the start of this movement the outer portions of the end members of the box or cover blanks, indicated at 550, project upwardly above the pocket 222. During this movement of the spider, provision is made for folding these portions 550 of the end members inwardly from the position shown in Fig. 25 to that shown in Fig. 26. For this purpose fixed folding plates 552 are arranged to engage during the above described movement of the pocket the portions 550 of the end members, fold them in the manner described, and retain them in folded position until the pocket carrying the partially completed box or cover arrives at a position in line with a block 554 carried on the end of a plunger 556 mounted to move horizontally in slideways 558 (Fig. 4), the outer portions 550 of the end members being guided while folded, as shown in Fig. 26, to a position inside the block 554. After the pocket has reached this second station, the block 554 is moved to the left, viewing Fig. 4, into the pocket. During this movement the block engages the outer portions 550 of the end members and folds them inwardly from the position illustrated in Fig. 26 to that illustrated in Fig. 27, with their adhesive surfaces against the inside of the tabs 430 and against their own inner portions which were previously glued to the outside of said tabs.

The block 554 is similar in construction to the block 221 and is mounted on the end of the plunger 556 in the same manner that the block 221 is mounted on the end of the plunger 408. Consequently, when the block 554 reaches the bottom of the pocket, its end plates expand in the same manner as the end plates 494 and 496 of the block 221 and press the folded end members with the tabs of the side members between their folds against the ends of the pocket to firmly affix the outer portion of the end members to their own inner portion and to the tabs secured thereto. This operation completes the formation of the box or cover. In order that this pressure may be evenly applied over the entire area of the end blanks, the end plates of the block 554 are preferably faced with soft rubber.

In order to impart to the plunger 556 the above described movements, the plunger has formed on it a lug 560 to which is pivoted one end of a link 562 connected to the lower end of a cam lever 564 pivotally mounted on a shaft 466 secured in fixed brackets 568. The cam lever 564 has pivoted on it a cam roll 570 engaging a cam path in a cam 572 secured to a shaft 574, the latter being arranged to rotate at the same speed as the shaft 278. The connection between the link 562 and the cam arm 564 is made a yielding one so that the pressure applied to the bottom and sides of the box may be yielding, and as herein shown a coil spring 576 is interposed between a shoulder 578 on the link 562 and a block 580 pivoted on the forked end of the cam lever 564. Nuts 582 threaded on the end of the link 562 on the side of the block 580 opposite the spring 576 regulate the tension on said spring.

The mechanism for intermittently rotating the shaft 548 and the spider 546 carried thereby, through successive intervals of 90°, includes in the illustrated machine a shaft 584 constantly rotating at the same speed as the shaft 278 and having secured to it a driving disk 586 to which is pivoted a driving roll 588 adapted to successively engage each of four slots 590 formed in a Geneva wheel 592 secured to the shaft 548 (Fig. 4). The periphery of the disk 586 is arranged to successively engage each of four arcuate recesses 594 formed in the Geneva wheel to lock the parts in position after they have been fed. In order to aid in stopping the Geneva wheel and avoid excessive strains on the parts of the machine, a brake drum 596 is secured to the shaft 548, about which a brake band 598 is tightened when the shaft 548 is nearing the end of its feeding movement. In order to thus tighten the brake band 598, one end of it is fixed at 600 to a fixed block 602 and the other end is secured to one end of a lever 604 pivoted at 606 to the block 602. The other end of the lever 604 is connected by means of a link 608 to one end of a cam lever 610 pivoted at 612 to the frame of the machine, and having pivoted on its other end a cam roll 614 which engages the periphery of a cam 616 secured to the shaft 574. A spring 618, connected between a pin in the cam lever 610 and one on the frame of the machine, holds the cam roll 614 against the cam 616.

After the block 454 has been withdrawn from the completed cover, the pocket carrying the cover is fed through two more steps of 90° each, to the position indicated at 618 in Figs. 4 and 15, and which position may be regarded as the ejecting station. At this position provision is made for ejecting the box or cover from the pocket. To this end, ejector plates 620, which normally fit into recesses 622 in the bottom of the pockets 222 are secured on the outer ends of slides 624 slidably mounted in guideways 626 formed in the arms 628 of the spider 546 (Figs. 15, 16, 17 and 18). In order to normally retain the plates 620 in this position with their outer faces flush with the bottom surfaces of the pockets 222, a roll 630 is pivotally mounted on the inner end of each of the slides 622 and engages an annular slot 632 concentric with the shaft 548 and formed in a fixed guide block 634 mounted on the shaft 548 between the spider 546 and the hub of the Geneva wheel 592. An arm 636 secured at one end to a lug 638 on the guide block 634 and at the other end to a portion of the frame of the machine, prevents the guide block from turning with the shaft 548.

In order that each of the slides 624 may be moved outwardly in its guideways 626 when the corresponding pocket reaches the position indicated at 618 in Figs. 4 and 15, to cause the ejector plate 620 secured to the slide to eject the cover from the pocket, a yoke 640 is mounted to slide horizontally on the shaft 548 being guided by the engagement of abutments 642 and 644 formed on the yoke with guideways 646 and 648 formed in the guide block 634. Formed on the end of the abutment 644 is a recess 650 which forms a continuation of the concentric annular slot 632 when the parts are in the position shown in Figs. 15 and 18, but which when the yoke 640 is moved to the right from the position shown in these figures, engages the roll 630 and moves the slide 624 and ejector plate 620 to the right to eject the box or cover from the pocket.

In order to thus move the yoke 640 to eject the box or cover from the pocket, a link 652 is pivotally connected at one end to the yoke and at the other end to the lower end of a cam arm 654 pivoted at its upper end to the shaft 566, and which has pivoted to it a cam roll 656 engaging a cam path formed in a cam 658 secured to the constantly rotating shaft 574, (Figs. 3 and 4).

The finished covers which are thus ejected from the successive pockets at the ejecting station are pushed onto a constantly driven conveyor 660 which carries them out of the machine.

While the improved box making machine thus far described operates to economically and satisfactorily produce the boxes or covers in an automatic and highly efficient manner, in some instances, however, particularly for the manufacture of relatively shallow boxes or covers, it is desirable that provision be made for forming the box or cover in a manner such that the tendency of the box or cover to bow or bulge outwardly will be reduced to a minimum. As herein shown, provision is made for folding the side members of the blanks inwardly through an angle of nearly 180° in order that the side members may be caused to assume the desired non-bulging position in the completed box or cover.

In the illustrated machine, as shown in Figs. 30 to 35, this folding operation is performed on the blanks after the end members thereof have been coated with adhesive and before said blanks are fed to the box forming mechanism. Accordingly, provision is made for feeding successive blanks from the gluing mechanism to a mechanism for performing the described folding operations and for thereafter feeding each blank, after the performance of the folding operation thereon, to the box forming mechanism.

In the illustrated machine adhesive is applied to the end members of the blanks by the gluing mechanism 200 which includes distributor rolls 284 and 286 and transfer rolls 302 and 304. In each cycle of operation of the machine a blank is fed into position beneath the gluing mechanism by the feed fingers 216 carried by the conveyor chains 202 and 204 and the adhesive is applied to the end members thereof in the manner previously described. In the next cycle of operation of the machine, the blank, having its end members coated with adhesive, is fed away from the gluing mechanism by one pair of feed fingers 216 and the succeeding blank fed into position beneath the gluing mechanism by the next pair of feed fingers. The feed fingers 216 convey the successive blanks from the gluing mechanism 200 to the right, viewing Figs. 30 and 34 along the table 178 and after the completion of each feeding movement of the conveyor chains 202 and 204 the blank which has been fed from the gluing mechanism 200 along the table 178 by said conveyor chains is engaged at its rear end by feed fingers 680 carried by conveyor chains 682 and 684 which feed it along the table 178 to a folding mechanism indicated generally at 686. At the same time the preceding blank is fed from the folding mechanism 686 along the table 178 to the feed rolls 218 and 220 which feed it to the box forming mechanism and the pusher 384 carried in the end of the slidable rack 386 and operated in the manner previously described, is provided to move said blank to its final position in the box forming mechanism. The conveyor chains 682 and 684 engage at one end idler sprockets 688 located adjacent the sprockets 208 which drive the chains 202 and 204 and at their other end the chains 682, 684 engage driving sprockets 690 adjacent the feed rolls 218 and 220.

Provision is made for intermittently rotating the driving sprockets 208 to impart the desired feeding movements to the conveyor chains 202 and 204, and provision is also made for intermittently rotating the sprockets 690 to drive the chains 682 and 684 in timed relation to the conveyor chains 202 and 204. In order to drive the conveyor chains 202 and 204, the sprockets 208 are secured on the inner ends of shafts 692 journalled in fixed brackets 694, Figs. 30, 31 and 34, and pinions 696 are secured on the outer ends of said shafts. A shaft 698 journalled in the brackets 694 below the shafts 692 has secured to it a pair of gears 700 which mesh with the pinions 696 and a pawl 702 pivotally mounted on one of said gears comprises one member of a pawl and ratchet clutch for driving the conveyor chains 202 and 204. The ratchet wheel 704 which is the second member of said clutch, is loosely mounted on the shaft 698 and is constantly rotated from a constantly driven cam shaft 706 by means of gears 708 and 710 secured to the ratchet wheel 704 and shaft 706, respectively, and an idler gear 712 meshing with said gears 708 and 710. A spring 714 carried by the gear 700 which carries the pawl 702 urges said pawl into engagement with the ratchet 704 and a stop screw 716 adjustably secured in the free end of an arm 718 pivoted at 719 to a fixed part of the machine engages the tail of the pawl 702 to hold it out of engagement with the ratchet against the pressure of the spring 714.

The sprockets 690 which drive the conveyor chains 682 and 684 are secured to a shaft 720 journalled in fixed brackets 722. A pinion 724 also secured to the shaft 720 meshes with a gear 726 loosely mounted on a constantly rotating clutch shaft 728. In order to intermittently drive the conveyor chains 682 and 684 in timed relation to the chains 202 and 204, a pawl and ratchet clutch comprising a pawl 730 pivoted on the gear 726 and a ratchet wheel 732 secured to the shaft 728 is provided. A stop screw 734 adjustably secured in the free end of an arm 736 pivoted at 738 to the frame of the machine normally engages the tail of the pawl 730 and holds said pawl out of engagement with the ratchet wheel 732 against the pressure of a spring 740.

In the modified machine illustrated in Figs. 30 to 35, the arms 718 and 736 are raised simultaneously, as will be described, to disengage the stop screws 716 and 734 from the pawls 702 and 730 and permit the springs 714 and 740 to move said pawls into engagement with the constantly rotating ratchet wheels 704 and 732. This sets the gears 700 and 726 in rotation and through the connections previously described sets the conveyor chains 202, 204, 682 and 684 in motion. After the gears 700 and 726 have rotated far enough to move the pawls 702 and 730 from beneath the stop screws 716 and 734 and before said gears have rotated through one complete revolution, the arms 718 and 736 are lowered to place the stop screws 716 and 734 in their original positions. As a result, when the gears 700 and 726 have rotated through one revolution, the stop screws engage the tails of the pawls and disengage said pawls from the ratchet wheels and stop the movement of the conveyor chains 202, 204, 682 and 684. The gears 700 and 726 and pinions 696 and 724 are so proportioned that when said gears are rotated through one revolution the conveyor chains 202 and 204 are fed through a distance exactly equal to the distance between successive feed fingers 216 and the chains 682 and 684 are fed through a distance exactly equal to the distance between successive feed fingers 680. This insures the blanks being fed to the glue mechanism 200 and the folding mechanism 686 in the correct relation.

It will be understood from the above description that in each cycle of operation of the illustrated machine the conveyor chains 682 and 684 are started in motion at the same time as the chains 202 and 204. It is, however, necessary for the conveyor chains 682 and 684 to remain in motion after the conveyor chains 202 and 204 have completed their feeding movement in order that the feed fingers 680 carried by said conveyor chains 682 and 684 may engage the rear end of the blank which has been moved to the right, viewing Figs. 30 and 34, by the feed fingers 216 from the position under the gluing mechanism 200 illustrated at 198 and move said blank to the folding mechanism 686 in the position illustrated at 742. To accomplish this, the constantly rotating ratchet wheel 732 which is the driving member of the pawl and ratchet clutch 730, 732 is rotated at a speed less than that at which the ratchet wheel 704, which is the driving member of the pawl and ratchet clutch 702, 704, is rotated. As a result, the gears 700 and 726 are started in rotation at the same time but as the gears 700 are rotated at a greater rate of speed than the gear 726 they rotate through one complete revolution sooner than the gear 726 and consequently the conveyor chains 202 and 204 complete their feeding movement before the conveyor chains 682 and 684 have completed theirs and after the feed fingers 216 have ceased to feed the blank away from the gluing mechanism 200, a pair of the feed fingers 680 engage the rear end of such blank and feed it to the folding mechanism 686.

The positions of the arms 718 and 736 which carry the stop screws 716 and 734 for controlling the operation of the pawl and ratchet clutches 702, 704, and 730, 732 are controlled from the cam 277, Fig. 3, through connections which will be described. These connections include the rock shaft 272 journalled in the bracket 274, the cam lever 275 and the cam roll 276 pivoted on said cam lever and engaging a groove in the cam 277, (Figs. 3 and 4). Arms 744 and 270, Fig. 30, are also secured to the shaft 272 and are connected by links 746 and 268 to one arm of bell crank levers 748 and 262 pivoted at 750 and 264 to fixed portions of the machine. The second arm of the bell crank lever 748 is connected by a link 752 to an extension 754 of the arm 718 and the second arm of the bell crank lever 262 is connected by a link 260 to the arm 736. When the shaft 272 is rocked in a clockwise direction, viewing Fig. 4, the arms 718 and 736 are raised, through the connections described, to disengage the stop screws 716 and 734 from the pawls 702 and 730, and when the shaft 272 is thereafter rocked in a counter-clockwise direction the arms 718 and 736 are lowered to return the stop screws 716 and 734 to their original positions in order that they may again engage the tails of the pawls 702 and 730 to disengage said pawls from the ratchets 704 and 732 after the gears 700 and 726 have rotated through one revolution.

The folding mechanism, indicated generally at 686, will now be described. As previously stated, successive blanks are fed by the feed fingers 680 to the folding mechanism 686 in the position indicated at 742, Figs. 30 and 35. The blanks are fed to the folding mechanism along a pair of upwardly springpressed shelves 756 and 758 carried by the table 178, which are positioned under the outer portions of the body of the blank, Figs. 32, 33 and 35. At this time laterally movable folding rolls 760 and 762 are positioned beneath the side members of the blank, as shown in Fig. 35. After the blank has been fed to the folding mechanism, a plunger 764 mounted in slideways 766 and having secured to its lower end a spider 768 which carries presser plates 770 and 772 arranged to engage the upper face of the blank above the shelves 756 and 758, is moved vertically downwardly to move the presser plates from the position illustrated in Fig. 35 to that indicated in Fig. 32. During this movement of the presser plates 770 and 772 the body portion of the blank is moved downwardly between the rolls 760 and 762 and the side members of the blank are turned upwardly at right angles by said rolls, as indicated in Fig. 32. In order to permit this downward movement of the blank under the influence of the plunger and presser plates posts 776 secured to and depending from the shelves 756 and 758 are slidably mounted in holes formed in the table 178. Springs 778 surrounding the posts urge the shelves 756 and 758 upwardly, and nuts 780 threaded onto the lower end of said posts limit the upward movement of the shelves.

After the side members of the blank have been folded upwardly at right angles to the body portion, in the manner above described, the rolls 760 and 762, which are rotatably mounted in brackets 782 and 784 carried by slides 786 and 788 mounted in fixed slideways 790 and 792, are moved inwardly and the side members of the blanks are folded down to the position indicated at 794 in Fig. 33. During this folding operation the rolls 760 and 762 fold the side members of the blanks down against bevelled upper surfaces 796 formed on the presser plates 770 and 772, and in order to permit said presser plates to move downwardly while said rolls are moving inwardly along said bevelled surfaces, the connection between the spider 768 and the presser plates is made a yielding one. To this end, the presser plates 770 and 772 are secured to the spider by bolts 800 on which are threaded nuts 802 and springs 804 surrounding the bolts 800 between the nuts 802 and the spider 768 permit the presser plates 770 and 772 to be moved downwardly when the rolls 760 and 762 are moved inwardly along the bevelled surfaces 796.

The plunger 764 is moved downwardly to perform the first part of the above described folding operation on the blank by a cam 806 secured to the constantly rotating shaft 278, Fig. 30, through connections which include a cam arm 808 on one end of which is pivoted a cam roll 810 cooperating with a cam groove formed in said cam. The cam arm 808 is secured at its other end to a rock shaft 812 journalled in brackets 814, and an arm 816 also secured at one end to the rock shaft 812 is connected at its other end by means of a link 818 to the upper end of the plunger 764.

Provision is also made for moving the slides 786 and 788 which carry the rolls 760 and 762 inwardly to perform the second part of the above described folding operation. For this purpose a cylindrical cam 820 is secured to the constantly rotating shaft 706 and a pair of cam arms 822 and 824 are provided on their lower ends with cam rolls 826 and 828 which engage cam grooves 830 and 832 formed in said cam. The cam arms 822 and 824 are secured at their upper ends to rock shafts 834 and 836 journalled in a bracket 838 and arms 840 and 842 secured at their lower ends to the rock shafts 834 and 836 are connected at their upper ends to the slides 786 and 788 by links 844 and 846.

After the side members of the blank have been folded inwardly in the manner described the rolls 760 and 762 are moved outwardly to their starting positions by the cam 820 and then the plunger 764 is moved upwardly by the cam 806 to return the presser plates 770 and 772 to their original positions. This permits the shelves 756 and 758 and the blank carried thereby to return to their original positions under the influence of the springs 778.

After the side members have been folded inwardly beyond the position which they normally occupy in the finished box in the manner above described, then the natural spring of the box forming material causes the side members to assume an upright position, and in this condition the box blank is fed to the box forming mechanism above described.

While the preferred embodiment of the invention has been illustrated and described, it will be understood that the same may be embodied in other forms within the scope of the following claims.

Having thus described the invention, what is claimed is:—

1. In a machine of the character described, in combination, blank forming mechanism including a pair of relatively movable die members, gluing mechanism including a glue applying device, and an intermittently operating feeding mechanism for transferring the blanks as they are formed from the blank forming mechanism to a position to be operated upon by the gluing mechanism including an intermittently operated feed member, and connections between said feed member and the movable die whereby the blanks are fed at the completion of the dieing operation.

2. In a box or cover making machine, in combination, blank forming mechanism, box forming mechanism cooperating therewith including a rotatable spider provided with a plurality of box holding members, a plunger for forcing a box blank into one of the box holding members to form the box, and mechanism for folding the side forming portions of each box blank through an angle of more than ninety degrees prior to the movement of the box blank into said box holding member.

3. In a box or cover making machine, in combination, means for withdrawing a strip of box material from a supply roll thereof, means for applying a finishing sheet to the strip as it is withdrawn and for folding the sides of the finishing sheet over the side edges of the strip, cooperating die members between which the cover strip is passed for forming a box blank from the strip, a conveyor, means for intermittently moving the conveyor, a gluing mechanism operative to apply adhesive to the end forming pieces of the box blank while the latter is supported upon said conveyor, a rotatable spider provided with four box shaped pockets, means for moving the box blank from the gluing mechanism to position it over one of the pockets, a plunger movable into the pocket for forcing the box blank into the pocket, means for folding the sides and end tabs while the box and pocket are in one position of the spider, means for folding the upper portion of the end pieces through an angle of substantially ninety degrees during the movement of the spider and the pocket into a succeeding station, a plunger operative while the pocket is in such succeeding station for folding the upper portion of the end pieces through an additional angle of substantially ninety degrees and into the interior of the box, and mechanism for ejecting the box at a succeeding station.

4. In a box or cover making machine, in combination, means for forming a covered strip of box material, blank forming mechanism to which said strip is fed, cooperating die members between which the cover strip is passed for forming a box blank from the strip, a conveyor, means for intermittently moving the conveyor, a gluing mechanism operative to apply adhesive to the end forming pieces of the box blank while the latter is supported upon said conveyor, a rotatable spider provided with four box shaped pockets, means for moving the box blank from the gluing mechanism to position it over one of the pockets, a plunger movable into the pocket for forcing the box blank into the pocket, means for folding the sides and end tabs while the box and pocket are in one position of the spider, means for folding the upper portion of the end pieces through an angle of substantially ninety degrees during the movement of the spider and the pocket into a succeeding station, a plunger operative while the pocket is in such succeeding station for folding the upper portion of the end pieces through an additional angle of substantially ninety degrees and into the interior of the box, and mechanism for ejecting the box at a succeeding station.

5. In a box or cover making machine, in combination, means for feeding successive cover box blanks into the machine, cooperating die members between which the cover strip is passed for forming a box blank from the strip, a conveyor, means for intermittently moving the conveyor, a gluing mechanism operative to apply adhesive to the end forming pieces of the box blank while the latter is supported upon said conveyor, a rotatable spider provided with four box shaped pockets, means for moving the box blank from the gluing mechanism to position it over one of the pockets, a plunger movable into the pocket for forcing the box blank into the pocket, means for folding the sides and end tabs while the box and pocket are in one position of the spider, means for folding the upper portion of the end pieces through an angle of substantially ninety degrees during the movement of the spider and the pocket into a succeeding station, a plunger operative while the pocket is in such succeeding station for folding the upper portion of the end pieces through an additional angle of substantially ninety degrees and into the interior of the box, and mechanism for ejecting the box at a succeeding station.

6. In a box or cover making machine, in combination, means for withdrawing a strip of box material from a supply roll thereof, means for applying a finishing sheet to the strip as it is withdrawn and for folding the sides of the finishing sheet over the side edges of the strip, blank forming mechanism, a conveyor, means for intermittently moving the conveyor, a gluing mechanism operative to apply adhesive to the end forming pieces of the box blank while the latter is supported upon said conveyor, a rotatable spider provided with four box shaped pockets, means for moving the box blank from the gluing mechanism to position it over one of the pockets, a plunger movable into the pocket for forcing the box blank into the pocket, means for folding the sides and end tabs while the box and pocket are in one position of the spider, and means for folding the end pieces over the previously folded end tabs and into the interior of the box.

7. In a box or cover making machine, in combination, means for withdrawing a strip of box material from a supply roll thereof, means for applying a finishing sheet to the strip as it is withdrawn and for folding the sides of the finishing sheet over the side edges of the strip, cooperating die members between which the cover strip is passed for forming a box blank from the strip, a conveyor, means for intermittently moving the conveyor, connections between the conveyor and die members whereby the blanks are conveyed at the completion of the dieing operation, a gluing mechanism operative to apply adhesive to the end forming pieces of the box blank while the latter is supported upon said conveyor, and means for thereafter folding the sides and end pieces of the box blank to form the box.

8. In a box or cover making machine, in combination, means for withdrawing a strip of box material from a supply roll thereof, means for applying a finishing sheet to the strip as it is withdrawn and for folding the sides of the finishing sheet over the side edges of the strip, cooperating die members between which the cover strip is passed for forming a box blank from the strip, a conveyor, means for intermittently moving the conveyor, connections between the conveyor and die members whereby the blanks are conveyed at the completion of the dieing operation, a gluing mechanism operative to apply adhesive to the end forming pieces of the box blank while the latter is supported upon said conveyor, a rotatable spider provided with four box shaped pockets, means for moving the box blank from the gluing mechanism to position it over one of the pockets, a plunger movable into the pocket for forcing the box blank into the pocket, means for folding the sides and end tabs while the box and pocket are in one position of the spider, means for folding the upper portion of the end pieces through an angle of substantially ninety degrees during the movement of the spider and the pocket into a succeeding station, a plunger operative while the pocket is in such succeeding station for folding the upper portion of the end pieces through an additional angle of substantially ninety degrees and into the interior of the box, and mechanism for ejecting the box at a succeeding station.

9. In a box or cover making machine, in combination, means for forming successive box blanks, a conveyor, means for intermittently moving the conveyor, a gluing mechanism operative to apply adhesive to the end forming pieces of the box blank while the latter is supported upon said conveyor, a rotatable spider provided with four box shaped pockets, means for moving the box blank from the gluing mechanism to position it over one of the pockets, a plunger movable into the pocket for forcing the box blank into the pocket, means for folding the sides and end tabs while the box and pocket are in one position of the spider, and means for folding the end pieces over the previously folded end tabs and into the interior of the box.

In testimony whereof I have signed my name to this specification.

WILLIAM A. JOPLIN.